Feb. 28, 1956　　　E. PARADIS ET AL　　　2,736,216
CHAIN SAW FILING TOOL
Filed Feb. 1, 1954　　　　　　　　　　　　3 Sheets-Sheet 1
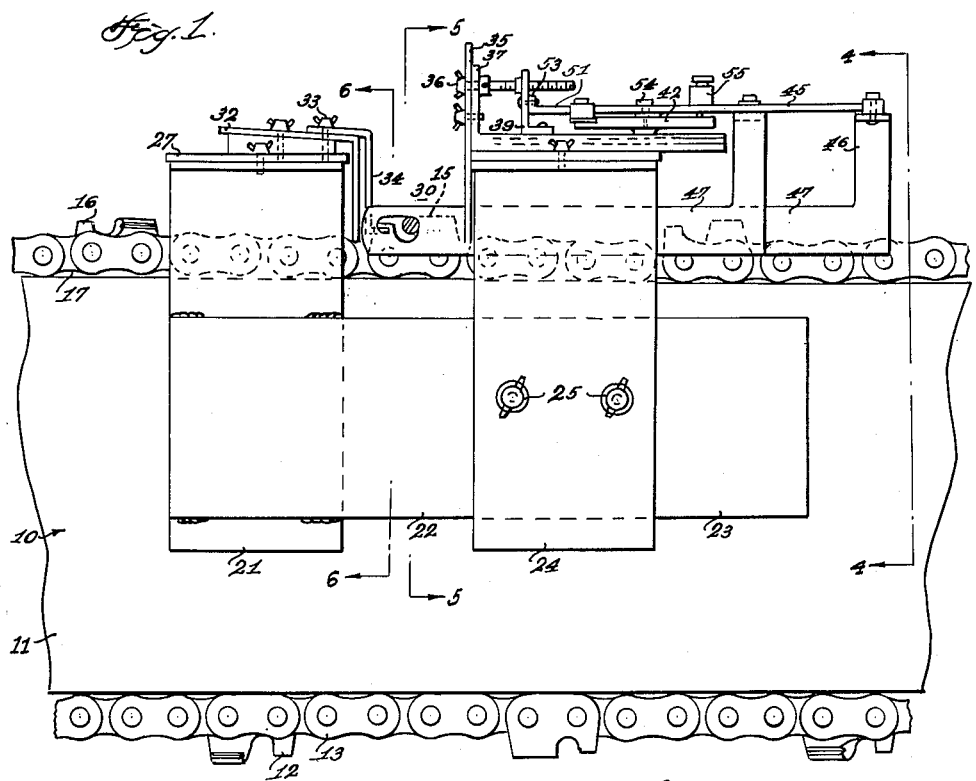
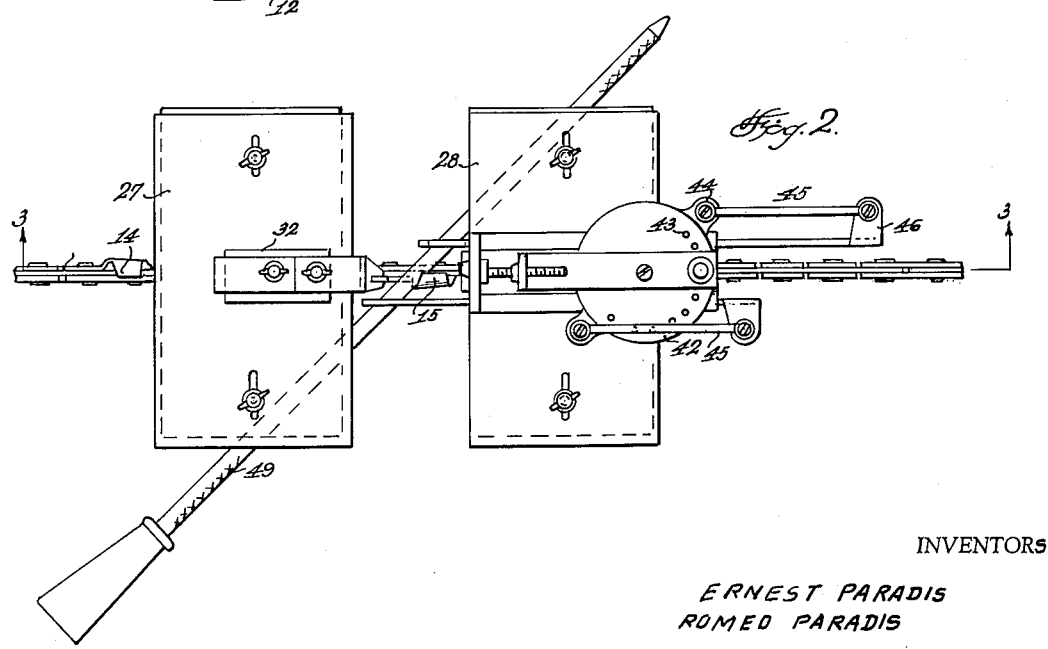
INVENTORS
ERNEST PARADIS
ROMEO PARADIS
BY Gustave Miller
ATTORNEY Feb. 28, 1956  E. PARADIS ET AL  2,736,216
CHAIN SAW FILING TOOL
Filed Feb. 1, 1954  3 Sheets-Sheet 2
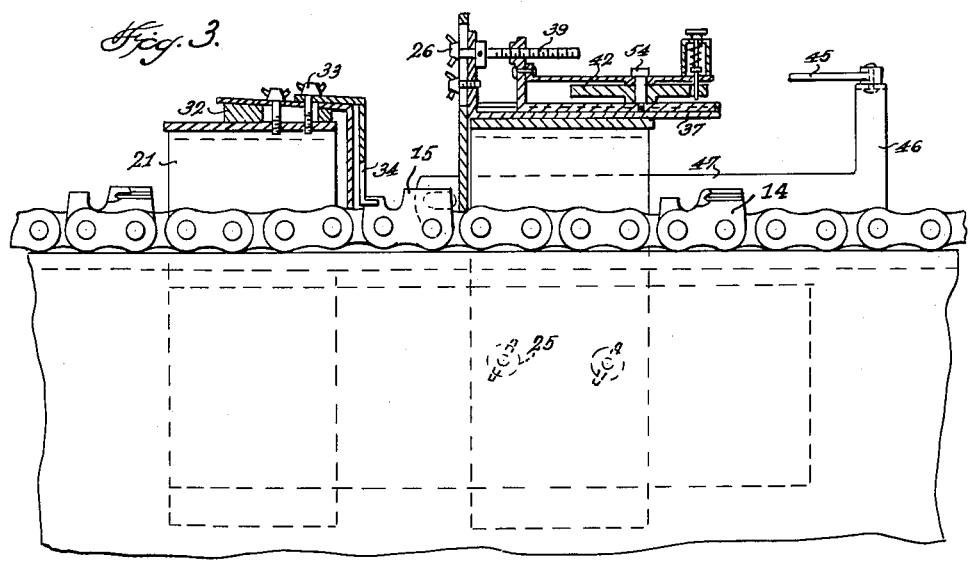
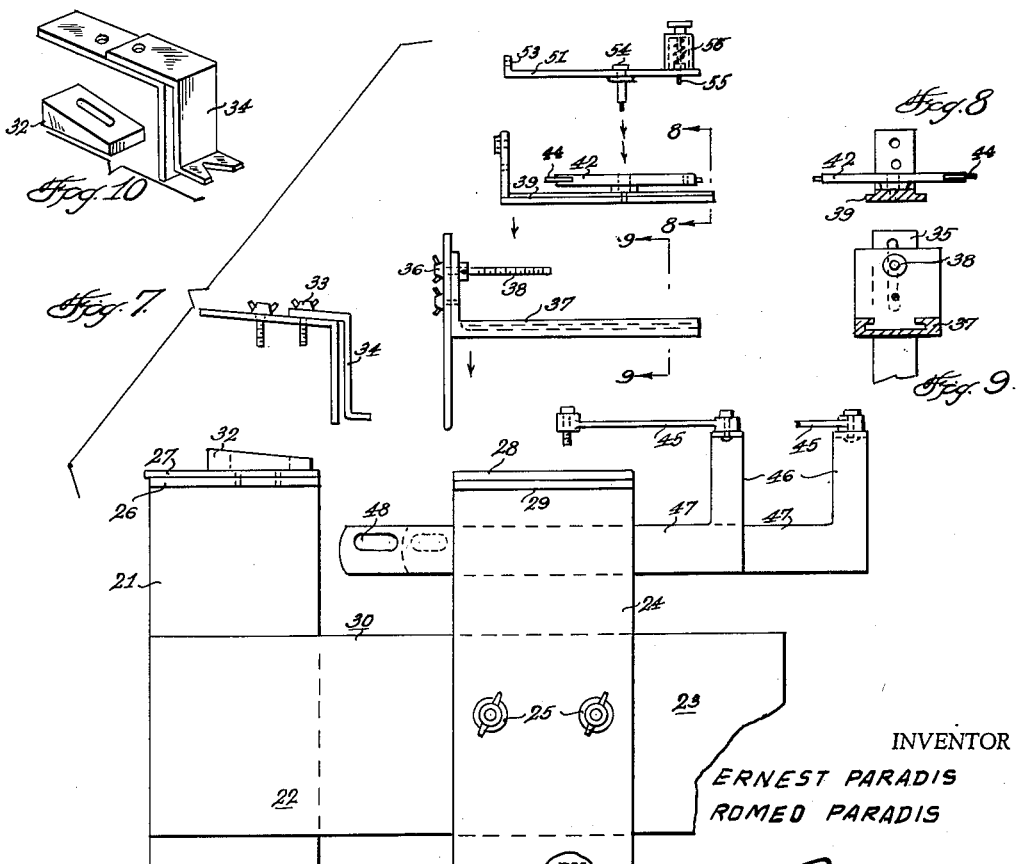
INVENTOR
ERNEST PARADIS
ROMEO PARADIS
BY Gustave Miller
ATTORNEY Feb. 28, 1956    E. PARADIS ET AL    2,736,216
CHAIN SAW FILING TOOL
Filed Feb. 1, 1954    3 Sheets-Sheet 3
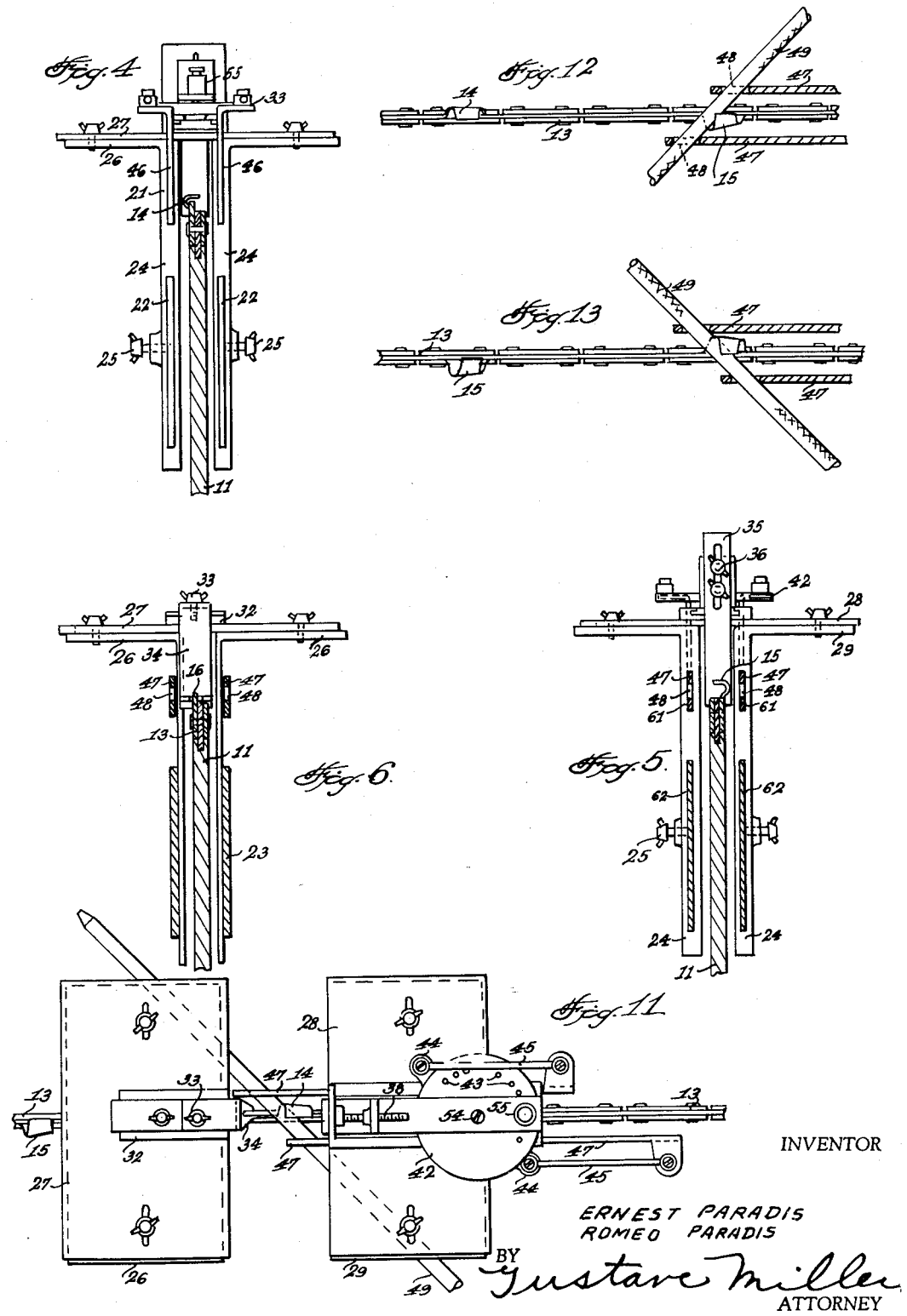
INVENTOR
ERNEST PARADIS
ROMEO PARADIS
BY Gustave Miller
ATTORNEY

United States Patent Office 2,736,216
Patented Feb. 28, 1956

2,736,216

CHAIN SAW FILING TOOL

Ernest Paradis and Romeo Paradis, Oakfield, N. Y.

Application February 1, 1954, Serial No. 407,372

3 Claims. (Cl. 76—31)

The present invention relates to saw filing devices and specifically to one that is portable and is of use in filing both the cutting and the raking teeth of chain saws.

Portable or semi-portable devices for sharpening chain saws are presently in use in the wide-spread forestry industry and are of many types. Chain saws themselves are of many types and designs, nearly every one of the individual makes requiring a different sharpening device. The industry has saws for use in hardwoods, in paper pulp woods, in every conceivable degree of dryness, green, aged, or other characteristic which requires a differently shaped cutting or raking tooth for maximum efficiency. A file guide for such various saws must be adjustable in many respects to accommodate even a few of the types of saw teeth.

The principal object therefore of the present invention is to provide a saw filing guide or device which is as nearly universally applicable to all saws as is possible.

Another object of the invention is to provide a saw filing guide which readily adapts itself to all chain saw teeth, cutting and raking, in all stages of wear of either or both.

A still further object of the present invention is to provide a chain saw file guide which is adjustably positioned on a chain saw bar for slidable movement therealong, if even the bar is of less width than the reach of the teeth, so that the entire length of chain saw may be readily sharpened.

Yet a further object of the invention, and a most important one, is the provision of a saw filing guide which makes it possible to alternatingly file left-facing or right-facing cutting teeth.

Another object of the invention is to provide a file guide for the rake tooth which ordinarily follows each single cutting tooth and which has a different shape and height than the cutting teeth.

These and other objects of the invention will be readily apparent from a consideration of the following description when taken in connection with the annexed drawings, in which like numerals indicate like parts throughout the several views, and in which:

Fig. 1 is a side view in elevation of the present invention;

Fig. 2 is a top plan view of the present invention;

Fig. 3 is a side view partially in cross-section taken on line 3—3 of Fig. 2;

Fig. 4 is an end view in elevation taken on line 4—4 of Fig. 1;

Fig. 5 is a view on line 5—5 of Fig. 1;

Fig. 6 is a view on line 6—6 of Fig. 1;

Fig. 7 is an exploded view of the parts of the present invention;

Fig. 8 is an end view of a portion of the invention taken on line 8—8 of Fig. 7;

Fig. 9 is an end view of another portion of the invention as seen on line 9—9 of Fig. 7;

Fig. 10 is a bracketed view of two portions of the invention;

Fig. 11 is a top plan view showing a file in action in the direction opposite to the file indicated in dotted lines in Fig. 2;

Fig. 12 is a detail view greatly enlarged of the position of the file guides with a file therein held for cutting action of a right-facing cutting tooth; and Fig. 13 is the same view with the file guides and file positioned while cutting a left-facing cutting tooth.

Referring to the drawings in more detail, it will be seen that 10 represents a chain saw having a central bar 11 and teeth 12 arranged on a chain 13. The bar 11 has a channel which is not here illustrated as not a part of the invention, or some other means for keeping the chain on the rim of the bar. In Figs. 2 and 12 will be seen a left-facing cutting tooth 14, while in Figs. 2 and 13 a right-facing cutting tooth is indicated at 15, although the showing of the saw parts including the teeth is merely illustrative of the present invention and not a part thereof. A raking tooth 16 is shown most clearly in Fig. 1.

The invention itself consists of a first bracket 21 having an L-shaped leg 22 with a base 23 on which is adjustably positioned a second bracket 24 by means of the thumb-screws 25. The bracket 21 has its upper leg 26 at a right angle and secured to the under side of the plate 27, which extends across the saw to where it is secured in the same way to another first bracket 21 of identical shape and having another second bracket 24 similarly secured thereon. The second brackets 24 have a second plate 28 adjustably fixed across their similarly extended legs 29, and together they form a table with an opening 30 between. On top of the table, so to speak, on plate 27 is adjustably positioned a wedge block 32, held by screw 33, and this supports an angularly shaped rake tooth gauge and file guide 34. On the other half of the table, on plate 28 is adjustably secured a vertically mounted stop or tooth guage 35, held by thumbscrews 36 at whatever height desired, on the angle bracket 37, which also carries an adjusting screw 38 for moving an index plate base 39 along its slotted leg 41, seen most clearly in end view in Fig. 9.

Upon the index plate base 39 is mounted a rotatable index plate 42, having holes 43 and pivot tabs 44.

The pivot tabs 44 have arms 45 pinioned therein which are in turn connected to the upstanding arms 46 of the file guides 47, of which there are two, one on each side of a tooth of the chain saw. A hole 48 in each file guide is meant to guide a file indicated in dotted lines at 49 in Figs. 2, 11, 12 and 13. On top of the index plate 42 is a bar 51 having an upturned end 53 by means of which it is riveted or otherwise secured to the index plate base 39, and which also holds the pin 54 on which the index plate 42 revolves, as well as an index pin 55 which is biased by spring 56 to seat itself in any one of the holes 43 in the index plate 42.

Referring to Fig. 5, it will be seen that the file guides 47 move in slots 61 in the second pair of brackets 24, and similarly the L-shaped leg 22 has its base 23 slidable in slots 62 formed in the brackets 24. As the cutting teeth 14 and 15 have sharpened edges necessarily angled outwardly, it will be seen that the invention, in Figs. 12 and 13, readily adapts itself to filing each tooth, whatever its angle, left or right, and also by means of selection and placement of the holes 43 in the index plate 42, it is readily apparent that the file guides 47 may be angled at any desired filing angle, their reciprocal movement in the opening 30 being obviously in response to any rotation of the index plate 42, and are held in whatever position desired by the index pin 55.

In brief, the invention is a small hand-held device which has brackets on each side to slip over a chain saw bar below the teeth, and the brackets may be moved away from each other to embrace a wider bar. The second bracket is adjustable on the base of the first bracket, in order that the rake tooth file guide and gauge 34 may encompass the rake tooth 16 while the stop or tooth gauge 35, which is adjustable vertically to set the tool at the proper distance for the wear of the cutting teeth 14, 15. It will be noted that the stop or tooth gauge 35, as in Figs. 1–3, rests on the draw-bar 17 of the chain 13, which generally is not subject to wear and when the rake tooth gauge and file guide 34 governs the one end of the device as far as resting on the chain at that end, the tooth gauge 35, resting on the draw-bar 17 maintains the tool in its proper position for repeatedly filing the cutting teeth, left and right alternatingly, by simple setting and resetting the index pin in the appropriate holes 43 in the plate 42.

The many advantages of the invention are apparent from the above description, and many changes and modifications may be made therein without departing from the spirit and scope of the invention, as set forth in the following claims.

What is claimed is

1. A chain saw filing guide comprising a first pair of upstanding brackets arranged in face to face relation, each of said pair of brackets having one of its legs extending at a right angle from its non-confronting face, a first plate adjustably secured on one side to each of said extended legs, the other leg of each of said first pair of brackets being L-shaped and adjustably supported on its extended base, one each of a second pair of brackets having similarly spaced confronting faces and one leg each similarly extended, a second plate similarly secured on one face to the extended legs of the last-named brackets and forming with said first plate an interrupted table having a central opening, said first and second pairs of brackets being adapted and arranged to engage the sides of a chain saw bar between their confronting faces, a combined rake tooth gauge and file guide adjustably positioned in said opening, a movable stop in said opening adapted to position a chain saw therein, a pair of cutting teeth file guides slidable in said opening and having spaced confronting faces, said pair of file guides having a file-receiving opening therethrough, and means on said second plate for adjustably positioning said file guides in said opening relative to each other whereby a file slidable in the file-receiving opening of each is angularly disposed in tooth filing position for either a left-facing or right-facing cutting tooth of a chain saw.

2. A chain saw filing guide comprising a first pair of upstanding brackets arranged in face to face relation, each of said pair of brackets having one of its legs extending at a right angle from its non-confronting face, a first plate adjustably secured on one side to each of said extended legs, the other leg of each of said first pair of brackets being L-shaped and adjustably supporting on its extended base, one each of a second pair of brackets having similarly spaced confronting faces and one leg each similarly extended, a second plate similarly secured on one face to the extended legs of the last-named brackets and forming with said first plate an interrupted table having a central opening, said first and second pairs of brackets adapted and arranged to engage the sides of a chain saw bar between their confronting faces, a combined rake tooth gauge and file guide adjustably positioned in said opening, a movable stop in said opening adapted to position a chain saw therein, a pair of cutting teeth file guides slidable in said opening and having spaced confronting faces, said pair of file guides having a file-receiving opening therethrough, an index plate rotatably mounted on said second plate on its other face and coplanar therewith, a pair of arms pivotally secured at one end, one each to said index plate at opposite sides thereof and at the other end one to each of said file guides for reciprocal movement in said opening upon rotation of said index plate, and means for positioning said file guides relative to each other.

3. A chain saw filing guide comprising a first pair of upstanding brackets arranged in spaced face to face relation, each of said pair of brackets having one of its legs extending at a right angle from its non-confronting face, a first plate adjustably secured on one side to each of said extended legs, the other leg of each of said pair of first brackets being L-shaped and adjustably supporting on its extended base one each of a second pair of brackets having similarly spaced confronting faces, one leg of each of said second pair of brackets being similarly extended from the non-confronting face thereof, a second plate similarly secured on its one face to the extended legs of the last named brackets and forming with said first plate an interrupted table having an opening centrally thereof, said first and second pairs of brackets adapted and arranged to engage the sides of a chain saw bar between their confronting faces, a combined rake tooth gauge and file guide in said opening and adjustably secured to said first plate, a vertically slidable stop mounted on said second plate and adapted to engage a draw-bar of a chain saw in said opening, a pair of cutting teeth file guides slidable in said opening and having spaced confronting faces adapted and arranged to engage a single cutting tooth therebetween, said pair of file guides each having an opening therethrough adapted to slidably receive a file, an index plate rotatably mounted on said second plate on its other face and coplanar therewith, a pair of arms pivotally secured one each to said index plate at opposite sides thereof, said arms connected one each to each of said file guides for reciprocal movement thereof alternately in said opening upon rotation of said index plate, and an index pin mounted on said second plate engageable with said index plate for positioning said file guides relative to each other.

References Cited in the file of this patent

UNITED STATES PATENTS 2,662,423    Greenlee _____ Dec. 15, 1953